(12) United States Patent
Okino et al.

(10) Patent No.: US 8,107,909 B2
(45) Date of Patent: Jan. 31, 2012

(54) RECEPTION DEVICE, RADIO COMMUNICATION TERMINAL, RADIO BASE STATION, AND RECEPTION METHOD

(75) Inventors: Kenta Okino, Yokohama (JP); Taku Nakayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 49 days.

(21) Appl. No.: 12/680,535

(22) PCT Filed: Sep. 17, 2008

(86) PCT No.: PCT/JP2008/066783
§ 371 (c)(1),
(2), (4) Date: Jun. 8, 2010

(87) PCT Pub. No.: WO2009/041331
PCT Pub. Date: Apr. 2, 2009

(65) Prior Publication Data
US 2010/0285766 A1 Nov. 11, 2010

(30) Foreign Application Priority Data
Sep. 28, 2007 (JP) ................................ 2007-255815

(51) Int. Cl.
*H04B 17/00* (2006.01)
(52) U.S. Cl. ............ 455/226.3; 455/450; 455/509; 455/63.1; 455/222; 370/329; 370/341
(58) Field of Classification Search .............. 455/226.3, 455/450, 509, 63.1, 135, 222, 296, 278.1; 370/329, 341
See application file for complete search history.

(56) References Cited

U.S. PATENT DOCUMENTS

| 6,577,674 | B1 * | 6/2003 | Ko et al. ................ 375/148 |
| 2001/0006540 | A1 * | 7/2001 | Kim et al. ................ 375/340 |
| 2005/0265466 | A1 * | 12/2005 | Wang .................... 375/260 |

FOREIGN PATENT DOCUMENTS

| EP | 1 742 401 | 1/2007 |
| JP | 2001-177497 | 6/2001 |
| JP | 2003-174429 | 6/2003 |
| JP | 3455773 | 10/2003 |
| JP | 2006-253915 | 9/2006 |
| JP | 2008-277936 | 11/2008 |
| WO | WO-2005/109711 | 11/2005 |

OTHER PUBLICATIONS

International Search Report for PCT/JP2008/066783, mailed on Dec. 22, 2008, 2 pages.

* cited by examiner

*Primary Examiner* — Tuan Pham
(74) *Attorney, Agent, or Firm* — Morrison & Foerster LLP

(57) ABSTRACT

A reception device 10 includes a channel estimator 130 configured to calculate channel estimation information for each of first to fourth known signals, the channel estimation information indicating estimation of a characteristic of a channel of the radio signal and an SNR estimator 150 configured to interpolate channel estimation information on an intersection by using the channel estimation information on each of the first known signal and the fourth known signal, the intersection being where a line joining the first known signal and the fourth known signal intersects with a line joining the second known signal and the third known signal, and to interpolate channel estimation information on the intersection by using the channel estimation information on each of the second known signal and the third known signal, and to calculate noise power of the radio signal on the basis of a difference between the interpolated two channel estimation information.

16 Claims, 6 Drawing Sheets

US 8,107,909 B2

RECEPTION DEVICE, RADIO COMMUNICATION TERMINAL, RADIO BASE STATION, AND RECEPTION METHOD

CROSS-REFERENCE TO RELATED APPLICATIONS

This is a U.S. National Phase Application of International Application No. PCT/JP2008/066783 filed Sep. 17, 2008, which claims priority to Japanese Patent Application No. 2007-255815 filed Sep. 28, 2007, the disclosures of which are incorporated herein by reference in their entirety.

TECHNICAL FIELD

The present invention relates to a reception device, a radio communication terminal, a radio base station, and a reception so method for receiving a radio signal including multiple known signals that are disposed in a scattered manner in the time direction and the frequency direction.

BACKGROUND ART

In radio communication systems, signal-to-noise ratio (SNR) has heretofore been widely used as a measure to indicate the receiving quality of a radio signal received by a reception device from a transmission device.

In a radio communication system, the amplitude and phase of a radio signal vary due to characteristics of a radio channel (e.g., frequency response characteristic) in addition to the influence of noise. For this reason, for accurate measurement of an SNR, it is important to remove the varied portion of the radio signal caused by the characteristics of the channel, and then calculate noise power.

In addition, the following technique has been proposed as an SNR measurement technique applicable to a multicarrier scheme using a number of sub carriers (see Patent Document 1).

The reception device described in Patent Document 1 receives a radio signal from a transmission device via a radio channel and estimates an SNR by using a first known signal and a second known signal included in the received radio signal. The first known signal and the second known signal here are signals whose signal pattern (e.g., an M sequence, a Walsh sequence, or the like) is known by the reception device. Moreover, the second known signal is disposed continuously after the first known signal in the time direction.

The reception device described in Patent Document 1 calculates the first known signal's channel estimation information indicating estimation of characteristics of the channel, and multiplies the second known signal by the calculated channel estimation information. The reception device then calculates noise power on the basis of the difference between the second known signal after the multiplication by the channel estimation information and the second known signal before the multiplication by the channel estimation information.

Patent Document 1: Japanese Patent No. 3455773 ([Claim 1], FIG. 3)

DISCLOSURE OF THE INVENTION

Meanwhile, in a multicarrier scheme, multiple known signals are not always continuous with each other in the time direction and are disposed in a scattered manner in the time direction and the frequency direction in some case.

Thus, with the technique described in Patent Document 1, if the first known signal and the second known signal are disposed in a scattered manner in the time direction, the characteristics of the channel at the time of reception of the first known signal may possibly differ from the characteristics of the channel at the time of reception of the second known signal.

The technique described in Patent Document 1 assumes that the channel estimation information corresponding to the first known signal is equivalent to the channel estimation information corresponding to the second known signal. Thus, disposition of the first known signal and the second known signal in a scattered manner in the time direction undermines the above assumption, leading to a possibility of being unable to calculate noise power accurately.

The present invention has been made to solve the above problem and has an objective to provide a reception device, a radio communication terminal, a radio base station, and a reception method which allow accurate calculation of noise power and thus accurate estimation of an SNR even when multiple known, signals are disposed in a scattered manner in the time direction and the frequency direction.

A first aspect of the present invention is summarized as a reception device (reception device 10) which receives a radio signal including a first known signal (first pilot signal P1), a second known signal (second pilot signal P2), a third known signal (third pilot signal P3), and a fourth known signal (fourth pilot signal P4) that are disposed in a scattered manner in a time direction and a frequency direction, the reception device comprising: an estimation information calculator (channel estimator 130) configured to calculate channel estimation information (channel estimation values $\hat{h}1(n)$ to $\hat{h}4(n)$) for each of the first known signal, the second known signal, the third known signal, and the fourth known signal, the channel estimation information indicating estimation of a characteristic of a channel of the radio signal; a first interpolation unit (first interpolation unit 151) configured to interpolate channel estimation information on an intersection by using the channel estimation information (channel estimation values $\hat{h}1(n)$ and $\hat{h}4(n)$) on each of the first known signal and the fourth known signal, the intersection being where a line joining the first known signal and the fourth known signal intersects with a line joining the second known signal and the third known signal; a second interpolation unit (second interpolation unit 152) configured to interpolate channel estimation information on the intersection by using the channel estimation information (channel estimation values $\hat{h}2(n)$ and $\hat{h}3(n)$) on each of the second known signal and the third known signal; and a noise power calculator (noise power calculator 154) configured to calculate noise power of the radio signal on the basis of a difference between the channel estimation information (channel estimation value $\hat{h}0_{1\text{-}4}(n)$) interpolated by the first interpolation unit and the channel estimation information (channel estimation value $\hat{h}0_{2\text{-}3}(n)$) interpolated by the second interpolation unit.

With such feature, by utilizing the fact that the values of the channel characteristics of the intersection are equal to each other, the noise power can be calculated while removing a varied portion of the radio signal caused by the channel characteristic. Accordingly, it is possible to provide a reception device which allows accurate calculation of the noise power and thus accurate estimation of an SNR even when multiple known signals are disposed in a scattered manner in the time direction and the frequency direction.

A second aspect of the present invention is summarized as the reception device according to the first aspect, wherein, when a noise is excluded from the radio signal, the channel estimation information interpolated by the first interpolation unit coincides with the channel estimation information interpolated by the second interpolation unit.

A third aspect of the present invention is summarized as the reception device according to the first aspect, wherein, based on a least squares method, the estimation information calculator compares the first known signal, the second known signal, the third known signal, and the fourth known signal with predetermined reference signals, respectively, to thereby calculate the channel estimation information on each of the first known signal, the second known signal, the third known signal, and the fourth known signal.

A fourth aspect of the present invention is summarized as the reception device according to the first aspect, further comprising: a third interpolation unit (third interpolation unit 153) configured to interpolate channel estimation information (channel estimation value $\hat{h}0(n)$) on the intersection by using the channel estimation information on each of the first known signal, the second known signal, the third known signal, and the fourth known signal; and a signal power calculator (signal power calculator 155) configured to calculate signal power of the radio signal by using the channel estimation information interpolated by the third interpolation unit and the noise power calculated by the noise power calculator.

A fifth aspect of the present invention is summarized as the reception device according to the first aspect, further comprising an SNR calculator (SNR calculator 156) configured to calculate a signal-to-noise ratio of the radio signal by using the signal power calculated by the signal power calculator and the noise power calculated by the noise power calculator.

A sixth aspect of the present invention is summarized as a radio communication terminal (radio communication terminal 200) comprising the reception device according to any one of the first to fifth aspects.

A seventh aspect of the present invention is summarized as a radio base station (radio base station 100) comprising the reception device according to any one of the first to fifth aspects.

A eighth aspect of the present invention is summarized as a reception method of receiving a radio signal including a first known signal, a second known signal, a third known signal, and a fourth known signal that are disposed in a scattered manner in a time direction and a frequency direction, the reception method comprising the steps of: calculating (step S104) channel estimation information for each of the first known signal, the second known signal, the third known signal, and the fourth known signal, the channel estimation information indicating estimation of a characteristic of a channel of the radio signal; interpolating (step S106) channel estimation information on an intersection by using the channel estimation information on each of the first known signal and the fourth known signal, the intersection being where a line joining the first known signal and the fourth known signal intersects with a line joining the second known signal and the third known signal; interpolating (step S106) channel estimation information on the intersection by using the channel estimation information on each of the second known signal and the third known signal; and calculating (step S109) noise power of the radio signal on the basis of a difference between the channel estimation information interpolated by using the channel estimation information on each of the first known signal and the fourth known signal and the channel estimation information interpolated by using the channel estimation information on each of the second known signal and the third known signal.

According to the present invention, it is possible to provide a reception device, a radio communication terminal, a radio base station, and a reception method which allow accurate calculation of noise power and thus accurate estimation of an SNR even when multiple known signals are disposed in a scattered manner in the time direction and the frequency direction.

BEST MODES FOR CARRYING OUT THE INVENTION

Next, embodiments of the present invention will be described with reference to the drawings. In the following description of the drawings, same or similar reference_signs denote same or similar elements and portions.

In the following, descriptions will be provided for (1) a schematic configuration of a radio communication system, (2) a configuration of a reception device, (3) operation of the reception device, (4) advantageous effects, and (5) other embodiments.

(1) SCHEMATIC CONFIGURATION OF RADIO COMMUNICATION SYSTEM

Figure 1:
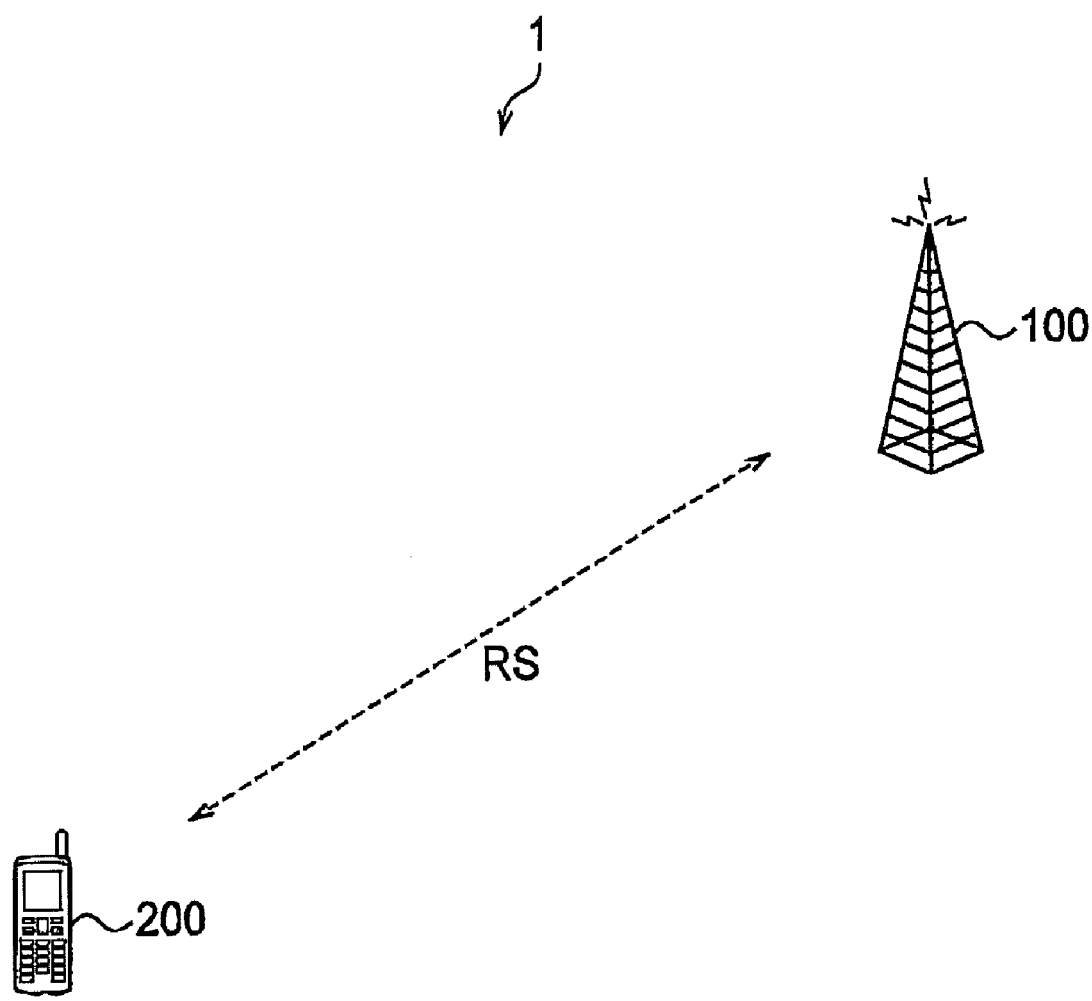
FIG. 1 is an overall schematic configuration diagram of a radio communication system according to an embodiment of the present invention.

First, a schematic configuration of a radio communication system according to an embodiment will be described. FIG. 1 is an overall schematic configuration diagram of the radio communication system 1 according to this embodiment.

As shown in FIG. 1, the radio communication system 1 includes a radio base station 100 and a radio communication terminal 200. The radio communication system 1 employs what is called a multicarrier scheme in which a radio signal RS is formed of multiple subcarriers.

Specifically, the radio communication system 1 employs the orthogonal frequency division multiplexing (OFDM) scheme. That is, a radio signal RS is formed based on the OFDM.

An OFDM system is assumed to be used for wideband communication. The OFDM is characterized in that a time period given for each symbol is longer than a case of a single carrier scheme. This means that the longer time period works advantageously in a multipath environment but also increases, relatively, a time variation of the symbol in a channel. That is, in a broad frequency domain and a long time domain, both a frequency variation and a time variation occur due to the influence of frequency selectivity and Doppler frequency.

In this embodiment, the radio communication system 1 employs dynamic channel assignment (DCA) for dynamically assigning subcarriers in accordance with an SNR, and adaptive modulation for selecting the modulation scheme in accordance with an SNR. In the adaptive modulation, an appropriate modulation scheme is selected from multiple modulation schemes, such as BPSK to (Binary Phase Shift Keying) and 24QAM (Quadrature Amplitude Modulation). For this reason, the radio base station 100 and the radio communication terminal 200 measure the SNR periodically.

Figure 2:
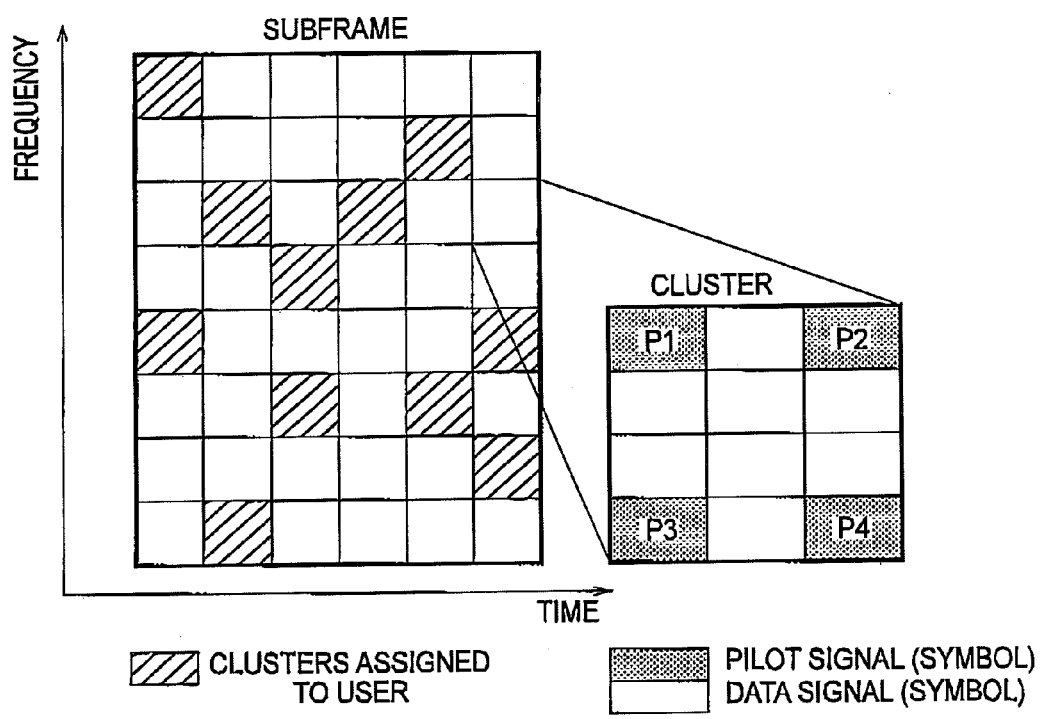
FIG. 2 is a schematic frame configuration diagram showing the configuration of an uplink subframe or a downlink subframe used in the radio communication system according to the embodiment of the present invention.

FIG. 2 is a frame configuration diagram showing a configuration of a frame used for uplink communication or downlink communication in the radio communication system 1, in other words, a configuration of an uplink subframe or a downlink subframe.

The radio communication terminal 200 has at least one cluster (which is a communication unit including a certain number of symbols in the time direction and in the frequency direction) assigned thereto in a subframe, and performs communication on a cluster basis. In a cluster, four or more known symbols (hereinafter, pilot signals) are disposed in a scattered manner in the time direction and the frequency direction. In this embodiment, four pilot signals P1 to P4 are disposed on the four corners of a cluster, respectively.

The radio base station 100 and the radio communication so terminal 200 calculate the channel estimation values indicating estimation of characteristics of a radio channel (e.g., frequency response characteristic), by using received pilot signals. The radio base station 100 and the radio communication terminal 200 then equalize data signals (data symbols) by using the calculated channel estimation values.

To be more specific, the radio base station 100 and the radio communication terminal 200 calculate the channel estimation values for the respective pilot signals by using the least squares (LS) method. For this reason, the channel estimation values each reflect not only the characteristics of the radio channel but also a noise component therein.

The radio base station 100 and the radio communication terminal 200 perform two-dimensional (frequency/time) interpolation (such as linear, quadratic or spline interpolation) by using the channel estimation values for the pilot signals to thereby estimate the channel estimation value for a data signal.

(2) CONFIGURATION OF RECEPTION DEVICE

Next, a configuration of a reception device 10 provided in the radio base station 100 and the radio communication terminal 200 will be described with reference to FIGS. 3 to 5. Note that in the following, points regarding the present invention will be mainly described.

(2.1) Functional Block Configuration of Reception Device

Figure 3:
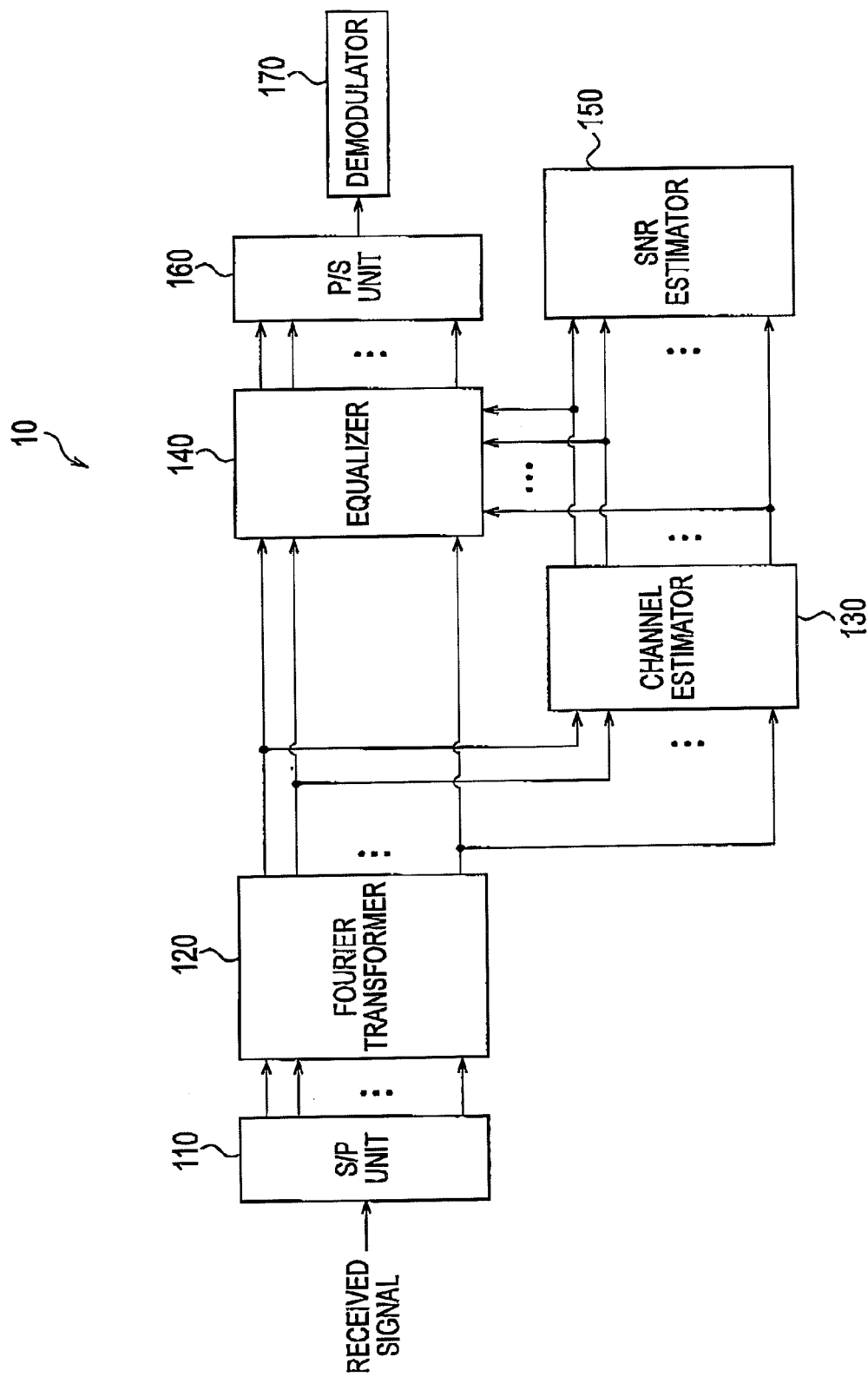
FIG. 3 is a functional block configuration diagram of a reception device according to the embodiment of the present invention.

FIG. 3 is a functional block configuration diagram of the reception device 10. As shown in FIG. 3, the reception device 10 includes a serial-parallel conversion unit (hereinafter, an S/P unit) 110, a Fourier transformer 120, a channel estimator 130, an equalizer 140, an SNR estimator 150, a parallel-serial conversion unit (hereinafter, a P/S unit) 160, and a demodulator 170.

The S/P unit 110 receives received signals via an antenna, an RF unit and the like whose illustrations are omitted here. The S/P unit 110 performs serial-parallel conversion on the received signals. The parallel signals to be outputted from the S/P unit 110 correspond to subcarriers, for example.

The Fourier transformer 120 performs FFT or DFT on the received signals after the serial-parallel conversion to thereby transform the received signals in the time domain to signals in the frequency domain.

The channel estimator 130 receives the received signal subjected to the frequency domain transform. The channel estimator 130 calculates channel estimation values by using the LS method. Specifically, the channel estimator 130 stores therein reference signals which are a signal sequence equivalent to pilot signals, and calculates channel estimation values through a comparison between the pilot signals and the reference signals.

In this embodiment, for each cluster, the channel estimator 130 calculates channel estimation values $\hat{h}1(n)$ to $\hat{h}4(n)$ (n: cluster number) for the pilot signal P1, the pilot signal P2, the pilot signal P3, and the pilot signal P4, respectively. The channel estimation values $\hat{h}1(n)$ to $\hat{h}4(n)$ indicate estimation of the characteristics of the channel of the radio signal RS.

The equalizer 140 receives the received signals subjected to the frequency domain transform. The equalizer 140 performs channel equalization on the received signals by using the channel estimation values calculated by the channel estimator 130. Specifically, the equalizer 140 corrects phase distortion and amplitude distortion in the radio signal RS generated through the channel, and reproduces the signal sequence transmitted at the transmitting side.

The P/S unit 160 performs parallel-serial conversion on the received signals after the correction. The demodulator 170 demodulates the output signals from the P/S unit 160 into the signal sequence transmitted at the transmitting side.

The SNR estimator 150 receives the channel estimation values calculated by the channel estimator 130. The SNR estimator 150 estimates the SNR of the radio signal RS (received signal) by using the channel estimation values.

(2.2) Functional Block Configuration of SNR Estimator

Next, a functional block configuration of the SNR estimator 150 will be described. FIG. 4 is a functional block configuration diagram of the SNR estimator 150.

Figure 4:
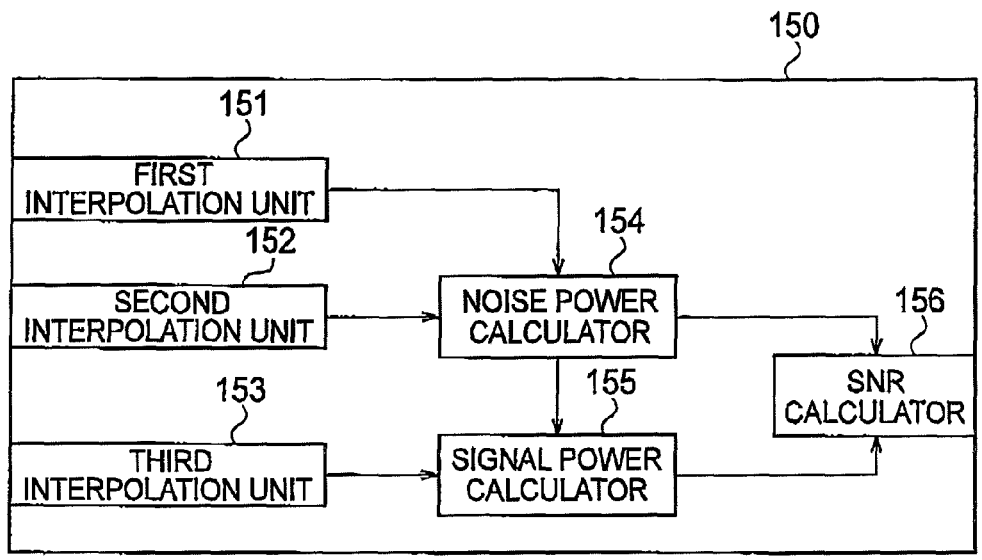
FIG. 4 is a functional block configuration diagram of an SNR estimator according to the embodiment of the present invention.

As shown in FIG. 4, the SNR estimator 150 includes a first interpolation unit 151, a second interpolation unit 152, a third interpolation unit 153, a noise power calculator 154, a signal power calculator 155, and an SNR calculator 156.

The first interpolation unit 151 performs first linear interpolation by using the channel estimation values $\hat{h}1(n)$ and $\hat{h}4(n)$ respectively for the pilot signal P1 and the pilot signal P4 to thereby acquire a channel estimation value $\hat{h}0_{1-4}(n)$ for an intersection C (see FIG. 5) where a line joining the pilot signal P1 and the pilot signal P4 intersects with a line joining the pilot signal P2 and the pilot signal P3.

The second interpolation unit 152 performs first linear interpolation by using the channel estimation values $\hat{h}2(n)$ and $\hat{h}3(n)$ respectively for the pilot signal P2 and the pilot signal P3 to thereby acquire a channel estimation value $\hat{h}0_{2-3}(n)$ for the intersection C.

The third interpolation unit 153 performs first linear interpolation by using the channel estimation values $\hat{h}1(n)$ to $\hat{h}4(n)$ respectively for the pilot signal P1, the pilot signal P2, the pilot signal P3, and the pilot signal P4 to thereby acquire a channel estimation value $\hat{h}0(n)$ for the intersection C.

The noise power calculator 154 calculates noise power $\hat{P}n$ of the radio signal RS on the basis of the difference between the channel estimation value $\hat{h}0_{1-4}(n)$ interpolated by the first interpolation unit 151 and the channel estimation value $\hat{h}0_{2-3}(n)$ interpolated by the second interpolation unit 152.

The signal power calculator 155 calculates the signal power of the radio signal RS by using the channel estimation value h^0(n) interpolated by the third interpolation unit 153 and the noise power P^n calculated by the noise power calculator 154.

Specifically, the signal power calculator 155 uses the channel estimation value h^0(n) to estimate a value of "signal power+quasi noise power" (the quasi noise power is acquired by multiplying the noise power by a constant), and calculates the signal power on the basis of the difference between the noise power P^n and the value of "signal power+quasi noise power."

The SNR calculator 156 calculates the SNR of the radio signal RS by using the signal power calculated by the signal power calculator 155 and the noise power P^n calculated by the noise power calculator 154. In other words, the SNR calculator 156 calculates the ratio of the signal power to the noise power P^n as the SNR.

(2.3) Processing of Calculating Channel Estimation Value

Next, processing of calculating channel estimation values performed by the channel estimator 130 will be described by using FIG. 5.

Figure 5:
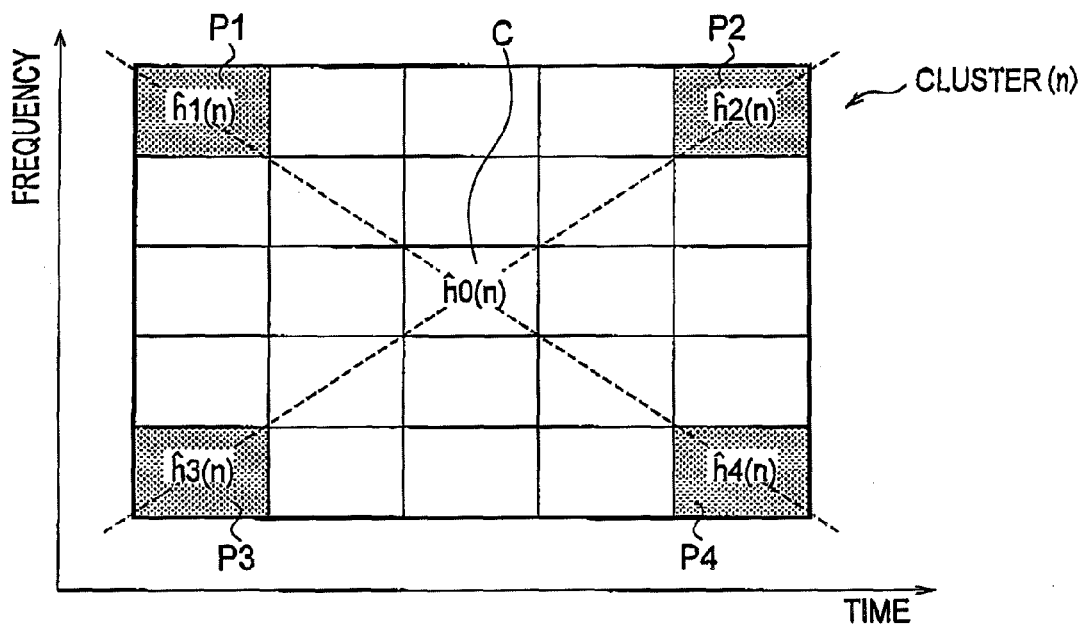
FIG. 5 is a conceptual diagram for explaining processing of calculating a channel estimation value and processing of calculating an SNR according to the embodiment of the present invention.

The channel estimator 130 calculates the channel estimation values h^1(n) to h^4(n) for the respective pilot signals P1 to P4 shown in FIG. 5. Here, the channel estimation values h^1(n) to h^4(n) acquired by the LS method reflect not only the characteristics of a channel but also a noise therein.

When the pilot signal P1 is "r1(n)" and the transmitted signal (i.e., the reference signal) is "s1(n)," the channel estimation value h^1(n) corresponding to the pilot signal P1 is calculated from a formula (1).

[Formula 1]

$$\hat{h}1(n) = \frac{r1(n)}{s1(n)} \quad (1)$$

In addition, a formula (2) holds when the channel characteristics corresponding to the pilot signal P1 are "h1(n)" and the noise corresponding to the pilot signal P1 is "n1(n)."

[Formula 2]

$$r1(n) = h1(n)s1(n) + n1(n) \quad (2)$$

As shown in the formula (2), each received signal received by the reception device 10 is assumed to be a signal which is transmitted at the transmitting side and subjected to channel variations, and to which a noise is added thereafter.

A formula (3) is obtained by substituting the formula (2) into the formula (1).

[Formula 3]

$$\hat{h}1(n) = h1(n) + \frac{n1(n)}{s1(n)} \quad (3)$$
$$= h1(n) + \hat{n}1(n)$$

Similarly, when the pilot signal P2 is "r2(n)," the transmitted signal (i.e., the reference signal) is "s2(n)," the channel characteristics corresponding to the pilot signal P2 are "h2(n)" and the noise corresponding to the pilot signal P2 is "n2(n)," the channel estimation value h^2(n) corresponding to the pilot signal P2 is expressed by a formula (4).

[Formula 4]

$$\hat{h}2(n) = h2(n) + \frac{n2(n)}{s2(n)} \quad (4)$$
$$= h2(n) + \hat{n}2(n)$$

Moreover, when the pilot signal P3 is "r3(n)," the transmitted signal (i.e., the reference signal) is "s3(n)," the channel characteristics corresponding to the pilot signal P3 are "h3(n)" and the noise corresponding to the pilot signal P3 is "n3(n)" the channel estimation value h^3(n) corresponding to the pilot signal P3 is expressed by a formula (5).

[Formula 5]

$$\hat{h}3(n) = h3(n) + \frac{n3(n)}{s3(n)} \quad (5)$$
$$= h3(n) + \hat{n}3(n)$$

Furthermore, when the pilot signal P4 is "r4(n)" the transmitted signal (i.e., the reference signal) is "s4(n)," the channel characteristics corresponding to the pilot signal P4 are "h4(n)" and the noise corresponding to the pilot signal P4 is "n4(n)" the channel estimation value h^4(n) corresponding to the pilot signal P4 is expressed by a formula (6).

[Formula 6]

$$\hat{h}4(n) = h4(n) + \frac{n4(n)}{s4(n)} \quad (6)$$
$$= h4(n) + \hat{n}4(n)$$

(2.4) Processing of Calculating SNR

Processing of calculating an SNR performed by the SNR estimator 150 will be described by using FIG. 5 again.

The SNR estimator 150 performs estimation of the SNR of the intersection C where the lines each joining the corresponding two pilot signals intersect with each other (i.e., where a data signal so D1 is located in the example in FIG. 3)

First, as shown in a formula (7), the SNR estimator 150 calculates the channel estimation value h^0(n) for the intersection C by using the channel estimation values h^1(n) to h^4(n) for the respective pilot signals P1 to P4. The channel estimation value h^0(n) is used for estimation of the value of "signal power+quasi noise power."

$$\hat{h}0(n) = \frac{\hat{h}1(n) + \hat{h}2(n) + \hat{h}3(n) + \hat{h}4(n)}{4} \quad \text{[Formula 7]}$$

A formula (8) is obtained by substituting the formulae (3) to (6) into the formula (7).

[Formula 8]

$$\hat{h}0(n) = \frac{h1(n) + h2(n) + h3(n) + h4(n)}{4} + \frac{\hat{n}1(n) + \hat{n}2(n) + \hat{n}3(n) + \hat{n}4(n)}{4} \quad (8)$$

Next, as shown in a formula (9), the SNR estimator 150 calculates the channel estimation value $\hat{h}0_{1-4}(n)$ for the center portion by performing first linear interpolation using the channel estimation values $\hat{h}1(n)$ and $\hat{h}4(n)$ for the respective pilot signals P1 and P4 located diagonally to each other in the cluster (n).

[Formula 9]

$$\hat{h}0_{1-4}(n) = \frac{\hat{h}1(n) + \hat{h}4(n)}{2} \qquad (9)$$
$$= \frac{h1(n) + h4(n)}{2} + \frac{\hat{n}1(n) + \hat{n}4(n)}{2}$$

Likewise, as shown in a formula (10), the SNR estimator 150 calculates the channel estimation value $\hat{h}0_{2-3}(n)$ for the center portion by performing first linear interpolation using the channel estimation values $\hat{h}2(n)$ and $\hat{h}3(n)$ for the respective pilot signals P2 and P3 located diagonally to each other in the cluster (n).

[Formula 10]

$$\hat{h}0_{2-3}(n) = \frac{\hat{h}2(n) + \hat{h}3(n)}{2} \qquad (10)$$
$$= \frac{h2(n) + h3(n)}{2} + \frac{\hat{n}2(n) + \hat{n}3(n)}{2}$$

The channel estimation values $\hat{h}0_{1-4}(n)$ and $\hat{h}0_{2-3}(n)$ are used for estimation of the noise power $\hat{P}n$. Specifically, the difference between the channel estimation values $\hat{h}0_{1-4}(n)$ and $\hat{h}0_{2-3}(n)$ represents the noise component of the intersection C.

Next, as shown in a formula (11), in order to estimate the signal power, the SNR estimator 150 calculates the ensemble mean of the squared absolute values of the channel estimation values $\hat{h}0(n)$ for the intersection C of all the clusters assigned to the so user (the radio communication terminal 200).

[Formula 11]

$$\langle|\hat{h}0(n)|^2\rangle = \left\langle \left| \frac{\frac{h1(n)+h2(n)+}{h3(n)+h4(n)}}{4} + \frac{\frac{\hat{n}1(n)+\hat{n}2(n)+}{\hat{n}3(n)+\hat{n}4(n)}}{4} \right|^2 \right\rangle \qquad (11)$$
$$= \left\langle \left| h0(n) + \frac{\hat{n}1(n) + \hat{n}2(n) + \hat{n}3(n) + \hat{n}4(n)}{4} \right|^2 \right\rangle$$
$$= \langle|h0(n)|^2\rangle + \frac{\langle|\hat{n}1(n)|^2\rangle + \langle|\hat{n}2(n)|^2\rangle + \langle|\hat{n}3(n)|^2\rangle + \langle|\hat{n}4(n)|^2\rangle}{16}$$
$$= \langle|h0(n)|^2\rangle + \frac{\hat{P}n}{4}$$

Here, $\langle\cdot\rangle$ represents the ensemble mean regarding all the clusters assigned to the user. Note that the formula (11) assumes $(h1(n)+h4(n))/2=(h2(n)+h3(n))/2=h0(n)$.

In addition, in the formula (11),

[Formula 12]

$$\hat{P}n = \langle|\hat{n}1(n)|^2\rangle = \langle|\hat{n}2(n)|^2\rangle = \langle|\hat{n}3(n)|^2\rangle = \langle|\hat{n}4(n)|^2\rangle \qquad (12)$$

$\hat{P}n$ in the formula (11) corresponds to the quasi noise power.

The SNR of the intersection C to be estimated by the SNR estimator 150 is the ratio of the power of the signal component in the received signal to the power of the noise component in the received signal. Specifically, when the channel characteristics of the intersection C are "$h0(n)$," the transmitted signal (i.e., the reference signal) of the intersection C is "$s0(n)$," and the noise of the intersection C is "$n0(n)$" the signal component is $h0(n)\,s0(n)$ and the noise component is $n0(n)$ The ensemble mean of the squared absolute values of the SNRs of the intersection C of all the clusters assigned to the user (the radio communication terminal 200) is expressed by a formula (13).

[Formula 13]

$$SNR = \frac{\langle|h0(n)s0(n)|^2\rangle}{\langle|n0(n)|^2\rangle} \qquad (13)$$
$$= \frac{\langle|h0(n)|^2\rangle}{\langle|n0(n)|^2\rangle / \langle|s0(n)|^2\rangle}$$
$$= \frac{\langle|h0(n)|^2\rangle}{\hat{P}n}$$

Next, as shown in a formula (14), in order to estimate the noise power $\hat{P}n$, the SNR estimator 150 calculates the ensemble mean of the squared absolute values of the differences between the channel estimation values for the intersection C that are expressed by the formulae (9) and (10).

[Formula 14]

$$\langle|\hat{h}0_{1-4}(n) - \hat{h}0_{2-3}(n)|^2\rangle = \left\langle \left| \begin{array}{l} \frac{h1(n)+h4(n)}{2} + \frac{\hat{n}1(n)+\hat{n}4(n)}{2} - \\ \frac{h2(n)+h3(n)}{2} - \frac{\hat{n}2(n)+\hat{n}3(n)}{2} \end{array} \right|^2 \right\rangle \qquad (14)$$

Here, the channel characteristics of the intersection C can be regarded as equal between the channel estimation values $\hat{h}0_{3-4}(n)$ and $\hat{h}0_{2-3}(n)$, whereby a formula (15) holds. Note that the formula (15) assumes $(h1(n)+h4(n))/2=(h2(n)+h3(n))/2\,h0(n)$, as in the case of the formula (11).

[Formula 15]

$$\frac{h1(n) + h4(n)}{2} = \frac{h2(n) + h3(n)}{2} \qquad (15)$$

Accordingly, the formula (14) is expressed by a formula (16) below.

[Formula 16]

$$\langle|\hat{h}0_{1-4}(n) - \hat{h}0_{2-3}(n)|^2\rangle = \left\langle \left| \frac{\hat{n}1(n)+\hat{n}2(n)+\hat{n}3(n)+\hat{n}4(n)}{2} \right|^2 \right\rangle \qquad (16)$$
$$= \frac{\langle|\hat{n}1(n)|^2\rangle + \langle|\hat{n}2(n)|^2\rangle + \langle|\hat{n}3(n)|^2\rangle + \langle|\hat{n}4(n)|^2\rangle}{4}$$
$$= \hat{P}n$$

Consequently, as shown in a formula (17), the SNR is estimated by using the "formula (11)–formula (16)/4" as the signal power and the formula (16) as the noise power P^n.

[Formula 17]

$$S\hat{N}R = \frac{\langle|\hat{h}0(n)|^2\rangle - \langle|\hat{h}0_{1-4}(n) - \hat{h}0_{2-3}(n)|^2\rangle/4}{\langle|\hat{h}0_{1-4}(n) - \hat{h}0_{2-3}(n)|^2\rangle} \quad (17)$$

The SNR estimator 150 can therefore estimate the SNR from the formula (17).

(3) OPERATION OF RECEPTION DEVICE

Figure 6:
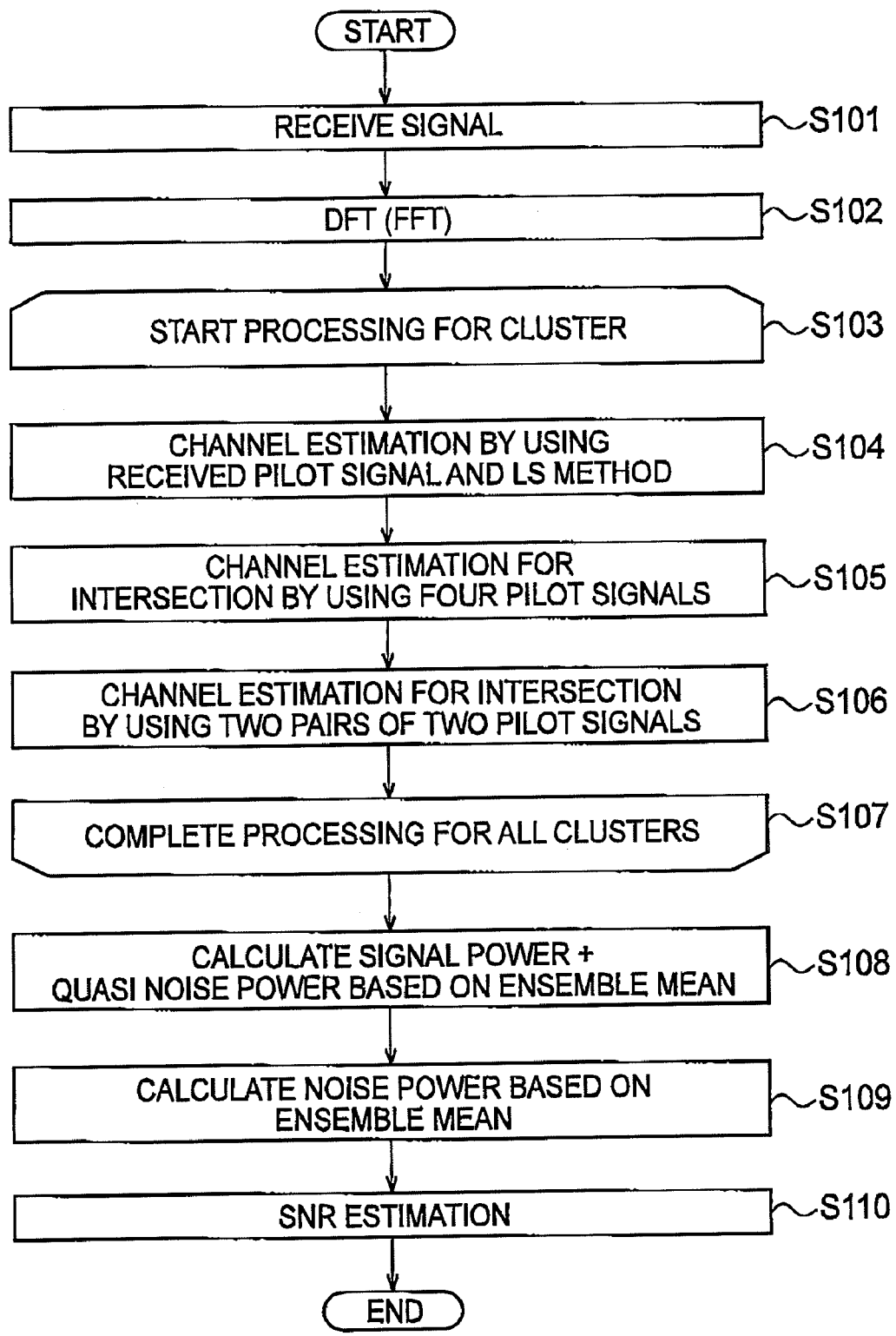
FIG. 6 is a flowchart showing operation of the reception device according to the embodiment of the present invention.

Next, operation of the reception device 10 will be described by using the flowchart shown in FIG. 6.

In Step S101, the S/P unit 110 performs serial-parallel conversion on received signals having been amplified and down-converted by the antenna and the RF unit.

In Step S102, the received signals in the time domain are transformed to signals in the frequency domain by FFT or DFT.

In Step S103, the processing for each cluster assigned to the radio communication terminal 200 starts.

In Step S104, the channel estimator 130 calculates channel estimation values $\hat{h}1(n)$ to $\hat{h}4(n)$ in accordance with the formulae (3) to (6), respectively.

In Step S105, the third interpolation unit 153 calculates a channel estimation value $\hat{h}0(n)$ for an intersection C in accordance with the formulae (7) and (8) using the channel estimation values $\hat{h}1(n)$ to $\hat{h}4(n)$.

In Step S106, the first interpolation unit 151 calculates a channel estimation value $\hat{h}0_{1-4}(n)$ in accordance with the formula (9). In addition, the second interpolation unit 152 calculates a channel estimation value $\hat{h}0_{2-3}(n)$ in accordance with the formula (10).

In Step S107, if it is judged that the processing from Steps S104 to S106 is completed for all the clusters assigned to the radio communication terminal 200, the process flow proceeds to Step S108. On the other hand, if the processing from Steps S104 to S106 has not been completed for all the clusters assigned to the radio communication terminal 200, the process flow returns to Step S103 and the processing for the next cluster starts.

In Step S108, the signal power calculator 155 calculates a value of "signal power quasi noise power" in accordance with the formula (11).

In Step S109, the noise power calculator 154 calculates a noise power P^n in accordance with the formula (16).

In Step S110, the SNR calculator 156 calculates an SNR in accordance with the formula (17).

(4) ADVANTAGEOUS EFFECTS

According to this embodiment, the noise power P^n is calculated by utilizing the fact that the values of the channel characteristics of the intersection C are equal to each other. That is to say, when a noise is excluded from the radio signal RS, the channel estimation value $\hat{h}0_{1-4}(n)$ interpolated by the first interpolation unit 151 coincides with the channel estimation value $\hat{h}0_{2-3}(n)$ interpolated by the second interpolation unit 152.

This makes it possible to calculate the noise power P^n while removing a varied portion of the radio signal RS caused by the channel characteristics. It is therefore possible to provide a reception device 10 which is capable of calculating noise power P^n accurately even when multiple pilot signals are disposed in a scattered manner in the time direction and the frequency is direction.

According to this embodiment, based on the LS method, the reception device 10 compares the pilot signal P1, the pilot signal P2, the pilot signal P3, and the pilot signal P4 with the predetermined reference signals to thereby calculate the channel estimation values for the pilot signal P1, the pilot signal P2, the pilot signal P3, and the pilot signal P4.

In this case, the calculated channel estimation values reflect both the characteristics of the channel and the influence of noise; however, as described above, the noise power P^n can be calculated while removing the varied portion of the radio signal RS caused by the characteristics of the channel.

Accordingly, it is possible to calculate the noise power P^n accurately even in a case of using channel estimation values calculated based on an algorithm requiring a small amount of calculation, such as the LS method. In other words, this embodiment makes it possible to reduce the processing load on the reception device 10 as compared with a case of using a complicated algorithm.

If allowed, the calculation of the channel estimation values should preferably be simpler because the calculation amount may be significantly large if sophisticated channel estimation and channel equalization were to be performed especially in a wide band system, such as the OFDM.

According to this embodiment, the reception device 10 interpolates the channel estimation value for the intersection C, and calculates the signal power of the radio signal RS by using the interpolated channel estimation value $\hat{h}0(n)$ and the calculated noise power P^n. Calculating the signal power by using the accurately calculated noise power P^n makes it possible to calculate the signal power more accurately.

According to this embodiment, the reception device 10 calculates the SNR of the radio signal RS by using the signal power and noise power P^n thus calculated. Since the signal power and noise power P^n are calculated accurately as described above, the SNR can be calculated more accurately. Thus, using the SNR calculated by the reception device 10, dynamic channel assignment and adaptive modulation can be achieved more efficiently.

(5) OTHER EMBODIMENTS

As described above, the present invention has been described by using the embodiment. However, it should not be understood that the description and drawings which constitute part of this disclosure limit the present invention. From this disclosure, various alternative embodiments, examples, and operation techniques will be easily found by those skilled in the art.

Figure 7:
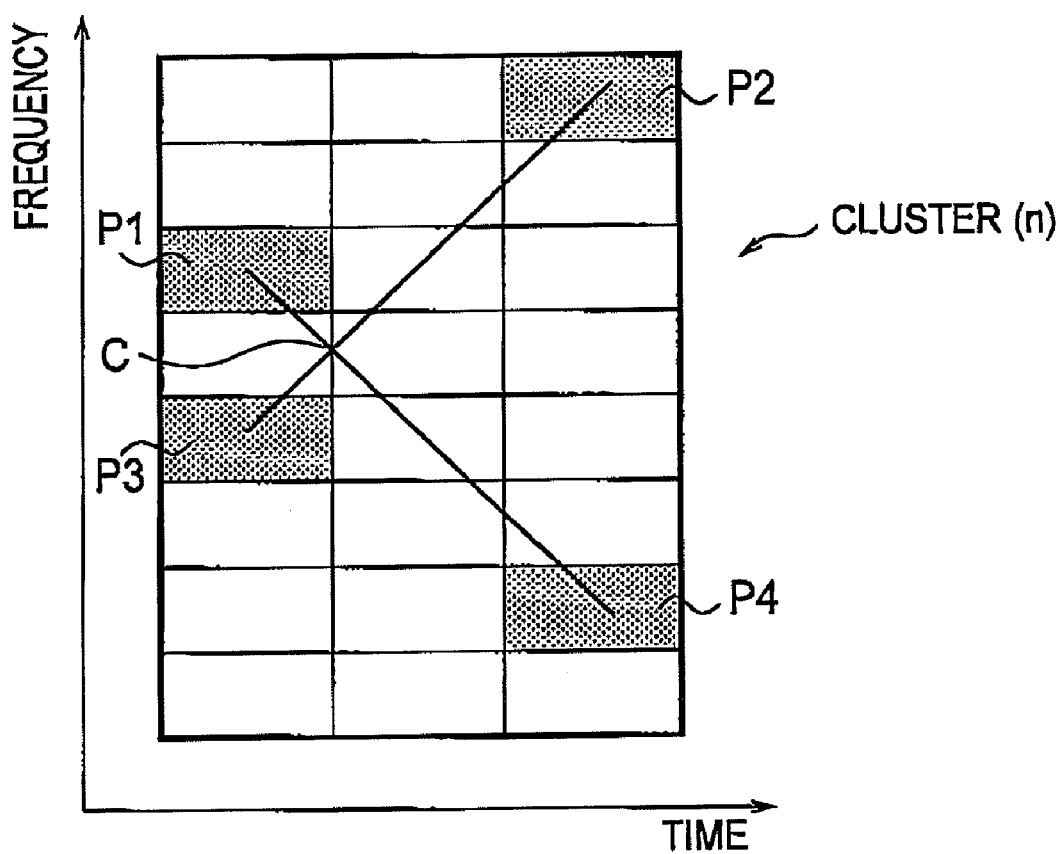
FIG. 7 is a cluster configuration diagram according to another embodiment.

In the foregoing embodiment, the four pilot signals P1 to P4 are disposed on the four corners of the cluster (n), respectively. However, the present invention is not limited to such case where the pilot signals P1 to P4 are disposed on the four corners of the cluster (n). As shown in FIG. 7, the pilot signals P1 to P4 may be disposed at any positions in the cluster (n). In short, one line joining two of the pilot signals P1 to P4 only has to intersect with the other line joining the other two pilot signals.

Further, the number of pilot signals in the cluster (n) is not limited to four, and may be five or more. Also, there may be only one cluster to be assigned to the radio communication terminal 200.

In the foregoing embodiment, the radio communication system 1 performing radio communication based on the OFDM is described. However, the radio communication system 1 may perform radio communication based on other multicarrier schemes than the OFDM.

In the foregoing embodiment, the noise power $P\hat{}n$ calculated by the noise power calculator 154 is used for calculation of the SNR. However, the use of the noise power $P\hat{}n$ calculated by the noise power calculator 154 is not limited to the calculation of the SNR, and may be used for adaptive array control, antenna calibration, and the like.

In the foregoing embodiment, the channel estimation values $h\hat{}0_{1-4}$ and $h\hat{}0_{2-3}$ are calculated through first linear interpolation. However, other interpolation methods than first linear interpolation may be employed.

As described above, it is to be understood that the present invention includes various embodiments which are not described herein. Accordingly, the present invention should be determined only by the matters to define the invention in the scope of claims regarded as appropriate based on this disclosure.

INDUSTRIAL APPLICABILITY

As has been described above, a reception device, a radio communication terminal, a radio base station, and a reception method according to the present invention allow accurate calculation of noise power and thus accurate estimation of an SNR even when multiple known signals are disposed in a scattered manner in the time direction and the frequency direction, and hence are useful in radio communication, such as mobile communication.

The invention claimed is:

1. A reception device which receives a radio signal including a first known signal, a second known signal, a third known signal, and a fourth known signal that are disposed in a scattered manner in a time direction and a frequency direction, the reception device comprising:
    an estimation information calculator configured to calculate channel estimation information for each of the first known signal, the second known signal, the third known signal, and the fourth known signal, the channel estimation information indicating estimation of a characteristic of a channel of the radio signal;
    a first interpolation unit configured to interpolate channel estimation information on an intersection by using the channel estimation information on each of the first known signal and the fourth known signal, the intersection being where a line joining the first known signal and the fourth known signal intersects with a line joining the second known signal and the third known signal;
    a second interpolation unit configured to interpolate channel estimation information on the intersection by using the channel estimation information on each of the second known signal and the third known signal; and
    a noise power calculator configured to calculate noise power of the radio signal on the basis of a difference between the channel estimation information interpolated by the first
    interpolation unit and the channel estimation information interpolated by the second interpolation unit.

2. The reception device according to claim 1, wherein, when a noise is excluded from the radio signal, the channel estimation interpolated by the first interpolation unit coincides with the channel estimation information interpolated by the second interpolation unit.

3. The reception device according to claim 1, wherein, based on a least squares method, the estimation information calculator compares the first known signal, the second known signal, the third known signal, and the fourth known signal with predetermined reference signals, respectively, to thereby calculate the channel estimation information on each of the first known signal, the second known signal, the third known signal, and the fourth known signal.

4. The reception device according to claim 1, further comprising:
    a third interpolation unit configured to interpolate channel estimation information on the intersection by using the channel estimation information on each of the first known signal, the second known signal, the third known signal, and the fourth known signal; and
    a signal power calculator configured to calculate signal power of the radio signal by using the channel estimation information interpolated by the third interpolation unit and the noise power calculated by the noise power calculator.

5. The reception device according to claim 4, further comprising an SNR calculator configured to calculate a signal-to-noise ratio of the radio signal by using the signal power calculated by the signal power calculator and the noise power calculated by the noise power calculator.

6. A radio communication terminal comprising the reception device according to claim 1.

7. A radio base station comprising the reception device according to claim 1.

8. A reception method of receiving a radio signal including a first known signal, a second known signal, a third known signal, and a fourth known signal that are disposed in a scattered manner in a time direction and a frequency direction, the reception method comprising the steps of:
    calculating channel estimation information for each of the first known signal, the second known signal, the third known signal, and the fourth known signal, the channel estimation information indicating estimation of a characteristic of a channel of the radio signal;
    interpolating channel estimation information on an intersection by using the channel estimation information on each of the first known signal and the fourth known signal, the intersection being where a line joining the first known signal and the fourth known signal intersects with a line joining the second known signal and the third known signal;
    interpolating channel estimation information on the intersection by using the channel estimation information on each of the second known signal and the third known signal; and
    calculating noise power of the radio signal on the basis of a difference between the channel estimation information interpolated by using the channel estimation information on each of the first known signal and the fourth known signal and the channel estimation information interpolated by using the channel estimation information on each of the second known signal and the third known signal.

9. A radio communication terminal comprising the reception device according to claim 2.

10. A radio communication terminal comprising the reception device according to claim 3.

11. A radio communication terminal comprising the reception device according to claim 4.

12. A radio communication terminal comprising the reception device according to claim 5.

13. A radio base station comprising the reception device according to claim 2.

14. A radio base station comprising the reception device according to claim 3.

15. A radio base station comprising the reception device according to claim 4.

16. A radio base station comprising the reception device according to claim 5.

* * * * *